(12) United States Patent
Lin

(10) Patent No.: US 8,001,752 B1
(45) Date of Patent: Aug. 23, 2011

(54) AUXILIARY DEVICE FOR A LAWN MOWER

(75) Inventor: Paul Lin, Tainan Hsien (TW)

(73) Assignee: Macauto Industrial Co., Ltd., Tainan Hsien (TW)

( * ) Notice: Subject to any disclaimer, the term of this patent is extended or adjusted under 35 U.S.C. 154(b) by 0 days.

(21) Appl. No.: 12/787,463

(22) Filed: May 26, 2010

(51) Int. Cl.
*A01D 34/00* (2006.01)

(52) U.S. Cl. ...................................................... 56/12.7

(58) Field of Classification Search ............... 56/12.7, 56/13.6, 13.7, DIG. 9; 30/276, 286, 123; 172/121
See application file for complete search history.

(56) References Cited

U.S. PATENT DOCUMENTS

| | | | | |
|---|---|---|---|---|
| 4,170,099 A | * | 10/1979 | Owens | 56/16.9 |
| 4,453,372 A | * | 6/1984 | Remer | 56/13.7 |
| 4,715,169 A | * | 12/1987 | Ould | 56/16.9 |
| 5,040,360 A | * | 8/1991 | Meehleder | 56/11.6 |
| 5,048,187 A | * | 9/1991 | Ryan | 30/276 |
| 5,226,284 A | * | 7/1993 | Meehleder | 56/11.6 |
| 6,155,035 A | * | 12/2000 | Merritt, III | 56/16.9 |
| 6,381,936 B1 | | 5/2002 | Lin | |
| 6,397,572 B1 | * | 6/2002 | Roundy et al. | 56/13.7 |
| 7,219,488 B2 | * | 5/2007 | Hatfield | 56/13.6 |

* cited by examiner

*Primary Examiner* — Árpád Fábián-Kovács
(74) *Attorney, Agent, or Firm* — Dickstein Shapiro LLP

(57) ABSTRACT

An auxiliary device is adapted to be electrically connected to a lawn mower, and includes a connecting unit having a first arcuate rack member, a housing turnably mounted on the connecting unit, a guard member turnably mounted on the housing and having a second arcuate rack member, and first and second pinions meshed with the first and second arcuate rack members, respectively. A sweeping area of a grass cutting member is adjusted by turning of the housing between a first position to increase a mowing area and to place a skirt portion of the guard member rearwardly of the grass cutting member, and a second position to enable the grass cutting member to be operated on an obstructed area and to place the skirt portion upwardly of the grass cutting member.

5 Claims, 11 Drawing Sheets

AUXILIARY DEVICE FOR A LAWN MOWER

BACKGROUND OF THE INVENTION

1. Field of the Invention

This invention relates to a lawn mower, more particularly to an auxiliary device adapted to be electrically and adjustably connected to a lawn mower for increasing the mowing area and for permitting operation on an obstructed area.

2. Description of the Related Art

In U.S. Pat. No. 6,381,936 B1 as shown in FIGS. 1 and 2, the applicant disclosed an auxiliary device 1 for a lawn mower 2 that includes a connecting member 11 detachably connected to the lawn mower 2, an anchoring member 12, an operating member 13, a first plug-and-socket assembly 14 disposed to interconnect the connecting member 11 and the anchoring member 12, a second plug-and-socket assembly 15 disposed to interconnect the anchoring member 12 and the operating member 13, a motor 16 mounted in the operating member 13 and electrically connected to the power supplying member of the lawnmower 2, and a grass cutting member 17 driven by the motor 16. By virtue of the first and second plug-and-socket assemblies 14,15, the angular positions of the anchoring member 12 and the operating member 13 are adjustable such that the sweeping plane of the grass cutting member 17 can be adjusted between a first position, as shown in FIG. 3, where a rotating axis of the grass cutting member 17 is parallel to that of the lawn mower 2 so as to increase a mowing area, and a second position, as shown in FIG. 4, where the rotating axis is transverse to that of the lawn mower 2 so as to enable the grass cutting member 17 to be operated on an obstructed area.

However, the angular adjustment of the grass cutting member 17 needs to be made by angularly moving first the anchoring member 12 relative to the connecting member 11, and subsequently twisting the operating member 13 relative to the anchoring member 12. Thus, such a multi-stage adjustment is quite inconvenient.

SUMMARY OF THE INVENTION

An object of the present invention is to provide an auxiliary device which is adjustably connected to a lawn mower for increasing the mowing area and for permitting operation on an obstructed area in a convenient manner.

According to this invention, the auxiliary device includes a connecting unit adapted to be mounted to the lawn mower, and having a mounting wall which defines a first axis normal thereto and substantially parallel to the ground, and a first arcuate rack member which is disposed on the mounting wall and which extends angularly about the first axis. A housing has a tubular surface to surround a second axis transverse to the first axis, and is mounted on and is turnable relative to the mounting wall about the first axis between a first position, where the second axis is in an upright line that is substantially normal to the ground, and a second position, where the second axis forms an included angle relative to the upright line. The tubular surface has operating-side and cutting-side tubular regions opposite to each other along the second axis. A guard member has a major wall which is mounted on and which is turnable relative to the cutting-side tubular region about the second axis. The major wall has mount and marginal regions which are radially opposite to each other, and which extend angularly about the second axis. The guard member further has a skirt portion which extends parallel to the second axis from the marginal region, and a second arcuate rack member which is disposed on the mount region, and which extends angularly about the second axis. First and second pinions are coaxially with each other, and are revolvably mounted on the cutting-side tubular region. The first and second pinions are in meshed engagements with the first and second arcuate rack members, respectively, such that, when the housing is turned from the first position to the second position, the skirt portion is displaced angularly from a first guarding position to a second guarding position which is angularly spaced apart from the first guarding position relative to the second axis.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
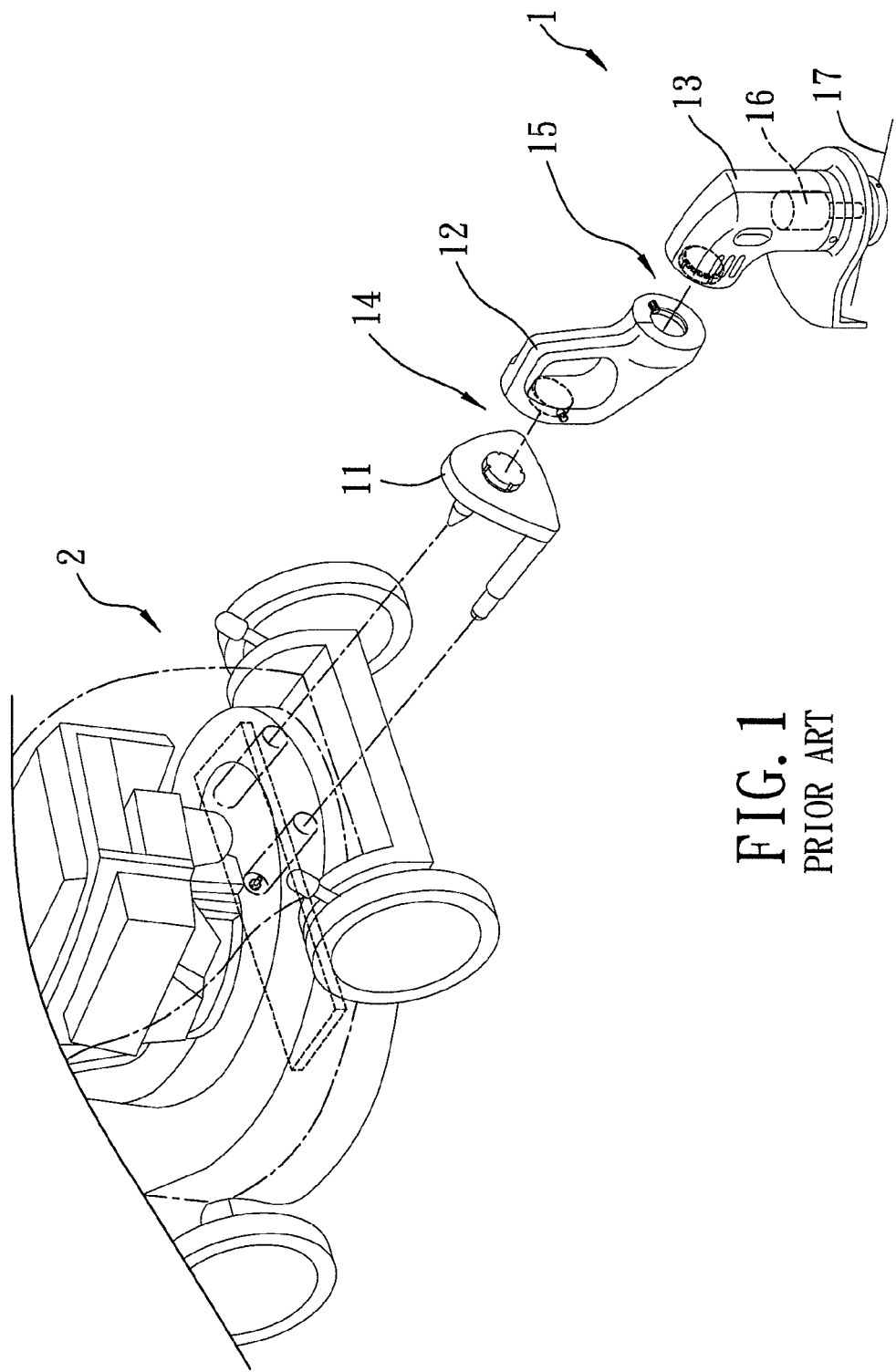
FIG. 1 is an exploded perspective view of a conventional auxiliary device disclosed in U.S. Pat. No. 6,381,936 B1.
Figure 2:
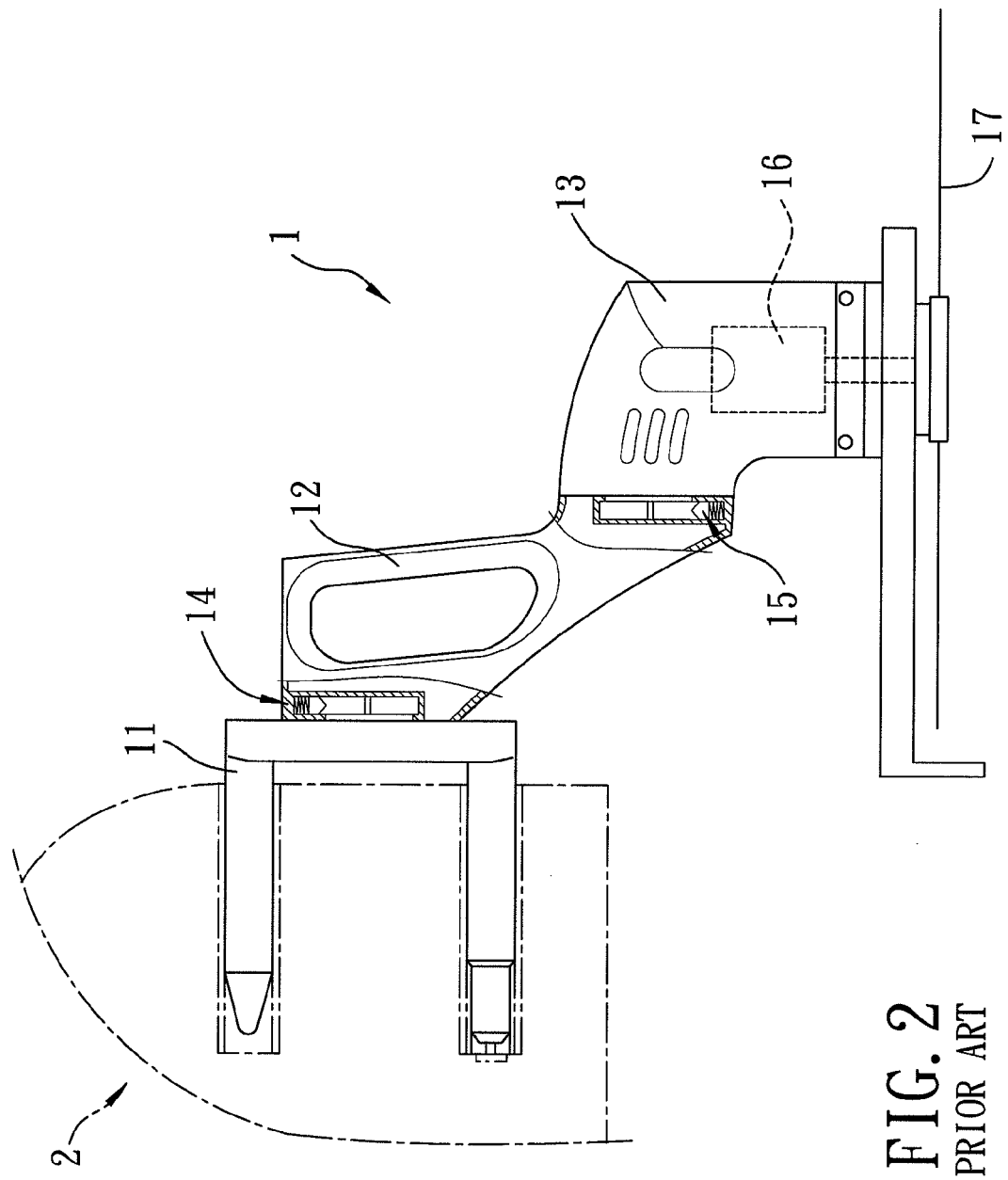
FIG. 2 is a partly sectional view of the conventional auxiliary device.
Figure 3:
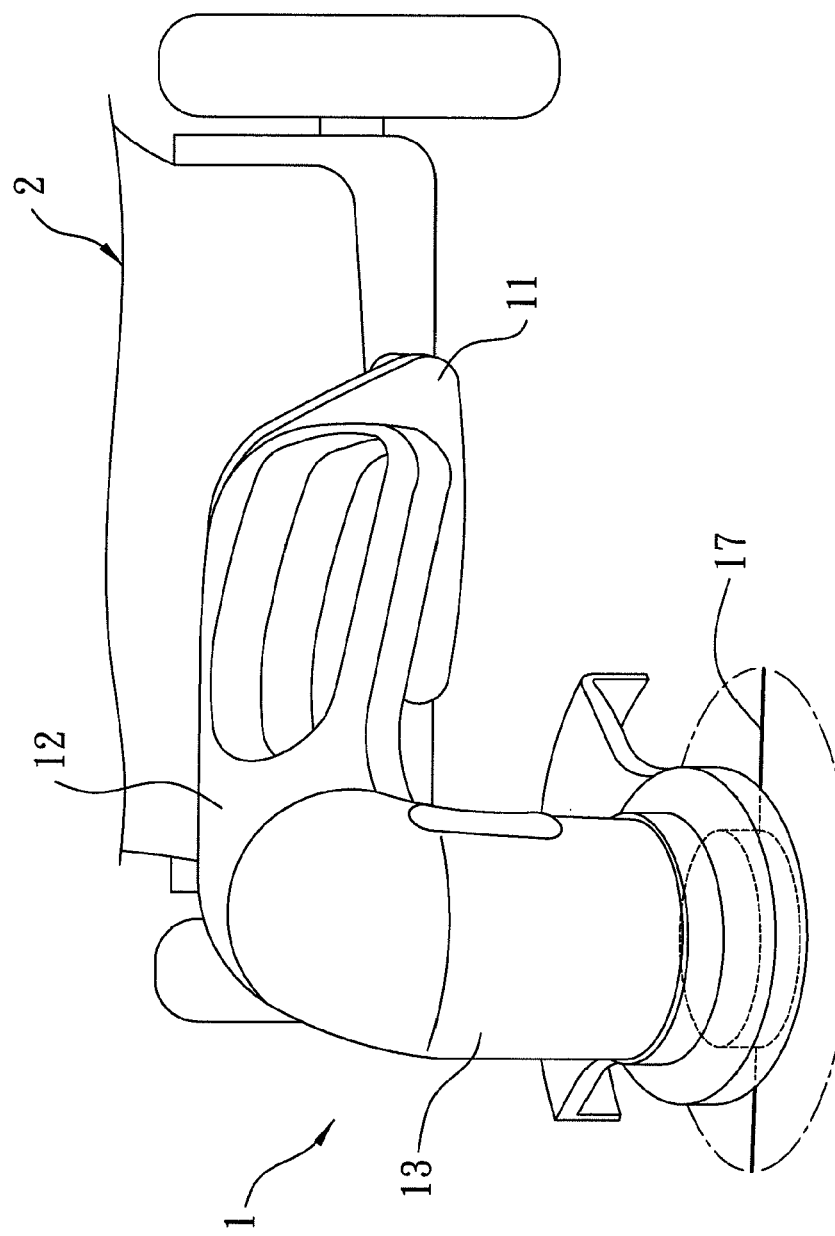
FIG. 3 is a perspective view showing a grass cutting member in a first position.
Figure 4:
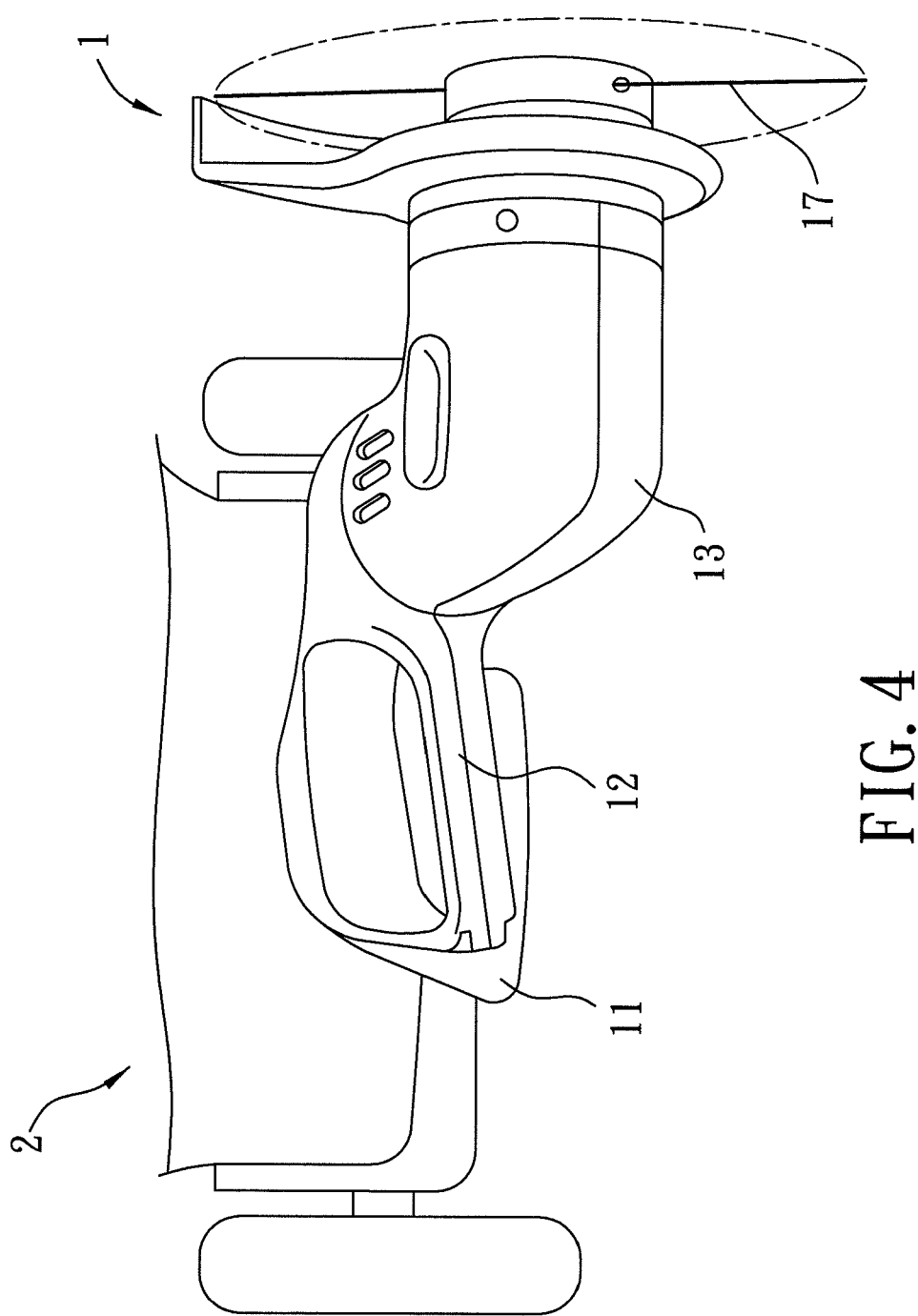
FIG. 4 is a perspective view showing the grass cutting member in a second position.
Figure 5:
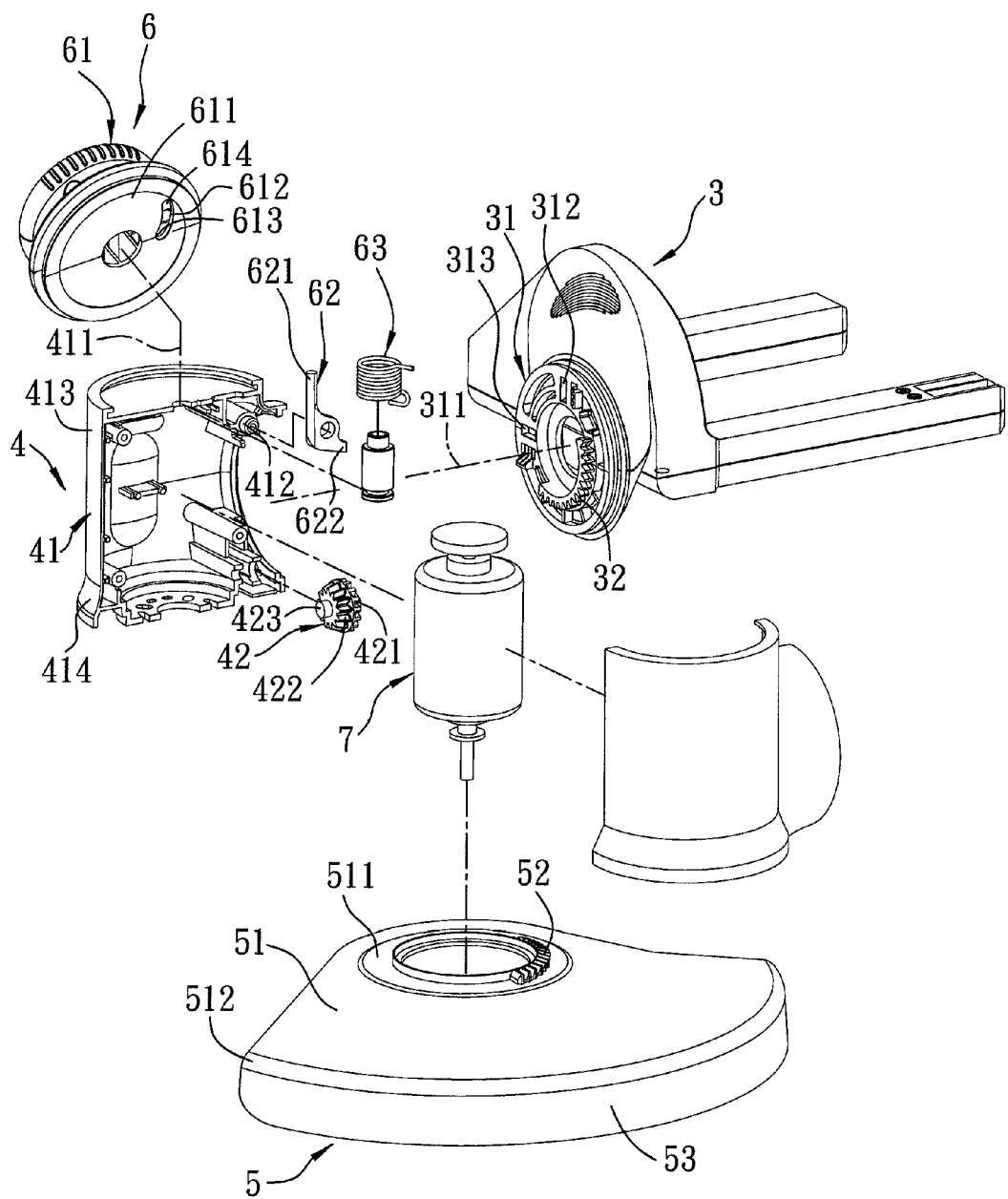
FIG. 5 is an exploded perspective view of the preferred embodiment of an auxiliary device according to this invention.
Figure 6:
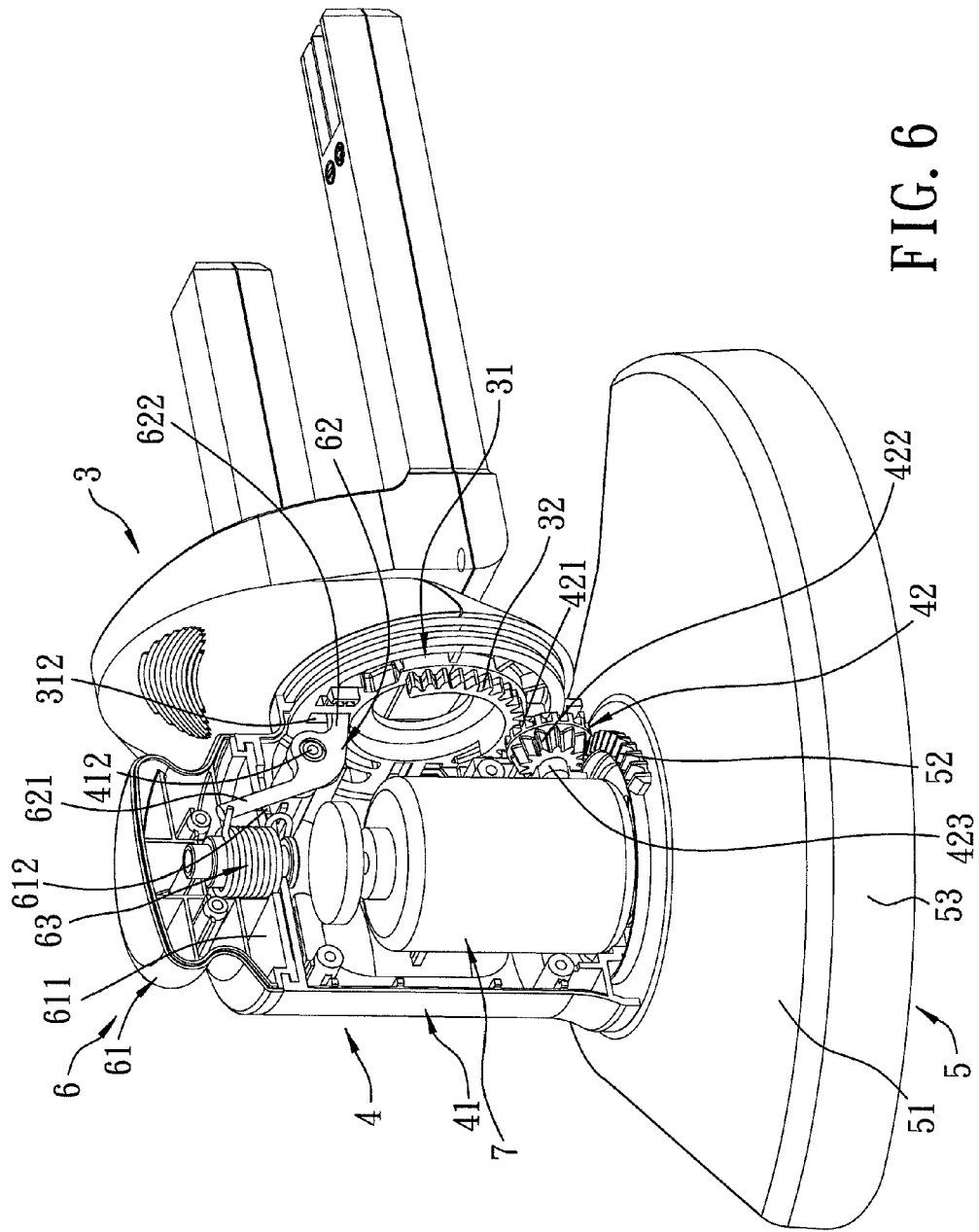
FIG. 6 is a fragmentary perspective view of the preferred embodiment.
Figure 7:
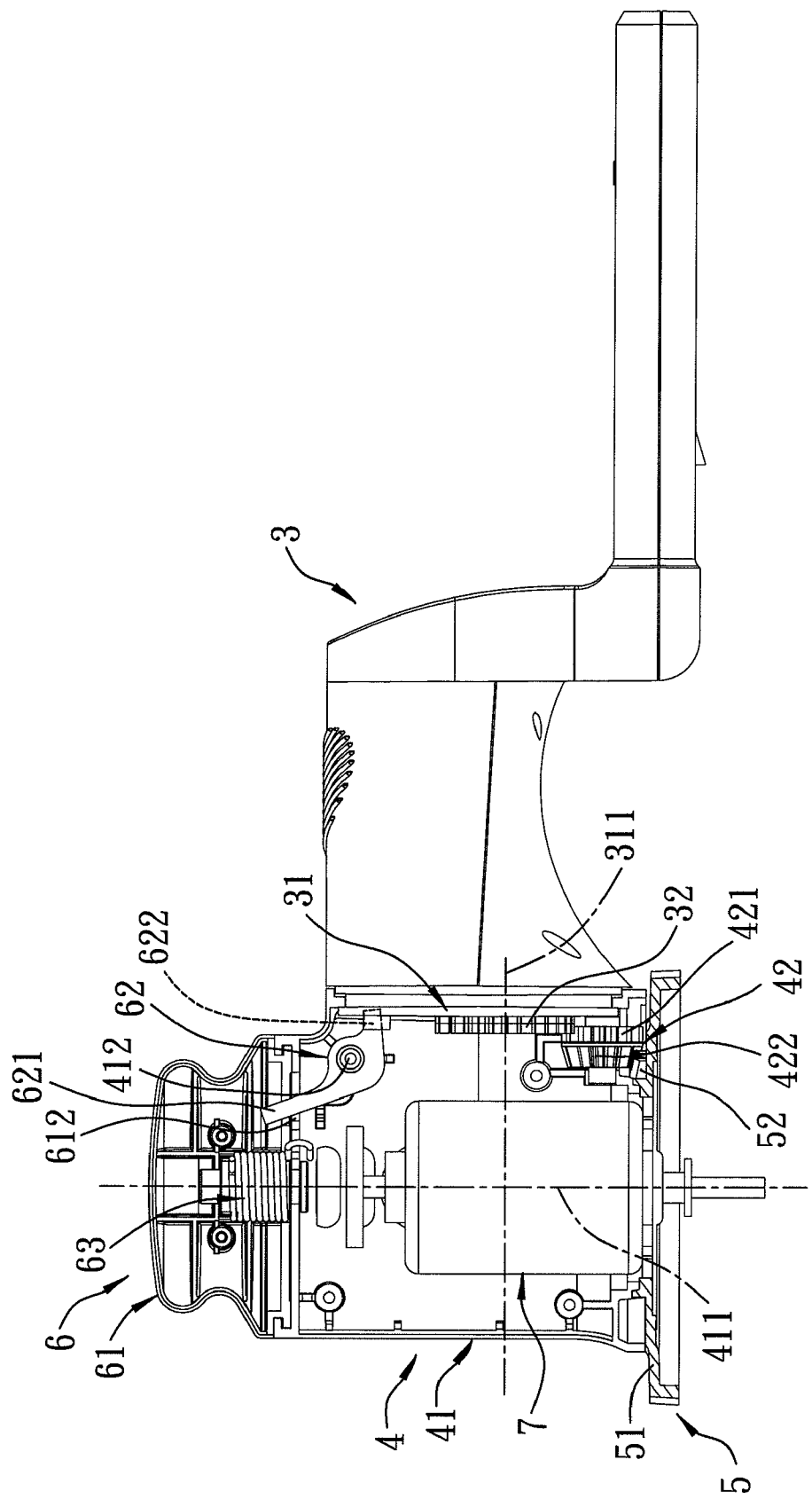
FIG. 7 is a partly sectional view of the preferred embodiment.

Referring to FIGS. 5 to 7, the preferred embodiment of an auxiliary device according to the present invention is shown to be electrically connected to a lawn mower (not shown). The lawn mower generally includes a primary cutter to cut lawn on the ground. The auxiliary device includes a connecting unit 3, a turnable unit 4, a guard member 5, a control unit 6, and a drive motor 7.

The connecting unit 3 is adapted to be detachably mounted to the lawn mower, and has a mounting wall 31 which defines a first axis 311 normal thereto and substantially parallel to the ground, and a first arcuate rack member 32 which is disposed on the mounting wall 31 and which extends angularly about the first axis 311. The mounting wall 31 has first and second grooves 312,313 which are angularly displaced from each other about the first axis 311 by an angle of 90 degrees.

Figure 8:
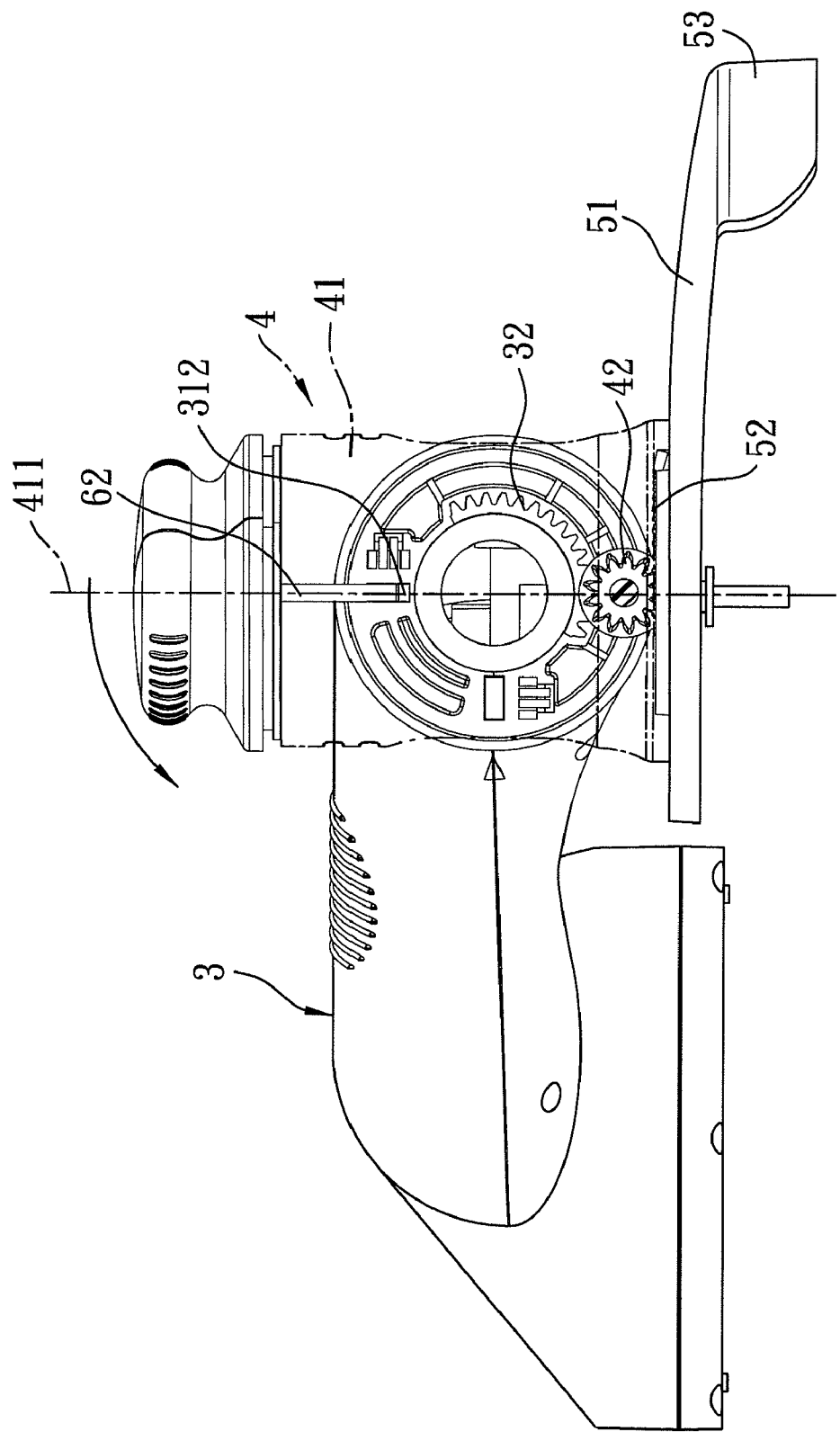
FIG. 8 is a schematic view showing a grass cutting member of the preferred embodiment in a first position.

The turnable unit 4 includes a housing 41 which is mounted on and which is turnable relative to the mounting wall 31 about the first axis 311, and a gear wheel 42 mounted in the housing 41 and idly rotatable about a pinion axis 423. The housing 41 has a tubular surface that surrounds a second axis 411 transverse to the first axis 311 such that the housing 41 is turnable between a first position, as shown in FIG. 8, where the second axis 411 is in an upright line that is substantially normal to the ground, and a second position, as shown in FIG.

11, where the second axis 411 forms an included angle relative to the upright line. The tubular surface has operating-side and cutting-side tubular regions 413,414 opposite to each other along the second axis 411. A stem 412 extends from the operating-side tubular region 413 to define a fulcrum axis transverse to the second axis 411. The gear wheel 42 includes first and second pinions 421,422 which are coaxially with each other, which are mounted on the cutting-side tubular region 414, and which are revolvable about the pinion axis 423. The first pinion 421 is in meshed engagement with the first arcuate rack member 32 such that the gear wheel 42 is moved along the first arcuate rack member 32 with the turning of the housing 41.

The guard member 5 has a major wall 51 which is mounted on and which is turnable relative to the cutting-side tubular region 414 about the second axis 411, and which has mount and marginal regions 511,512 radially opposite to each other and extending angularly about the second axis 411, a skirt portion 53 which extends parallel to the second axis 411 from the marginal region 512, and a second arcuate rack member 52 which is disposed on the mount region 511, and which extends angularly about the second axis 411. The second pinion 422 is in meshed engagement with the second arcuate rack member 52 such that the guard member 5 is turnable about the second axis 411 with the movement of the gear wheel 42 along the first arcuate rack member 32.

The control unit 6 includes an operating member 61 mounted on and turnable relative to the operating-side tubular region 413 about the second axis 411 by a manual force, a locking member 62 in the form of a pivoting lever 62 which is pivotally connected to the stem 412 about the fulcrum axis, and a biasing member 63 mounted between the operating member 61 and the housing 41. The operating member 61 has an end wall 611 disposed normal to the second axis 411, and a cam surface 612 in the form of an arcuate slot 612 which has a first end 613 and a second end 614, and which extends angularly and outwardly from the first end 613 to the second end 614. The pivoting lever 62 has a cam follower segment 621 and a locking end 622 opposite to the cam follower segment 621 relative to the fulcrum axis. Thus, by means of slidable engagement between the cam follower segment 621 and the cam surface 612, the locking end 622 is moved to be engaged in one of the first and second grooves 312,313 when the pivoting lever 62 is in a locking position, where the housing 41 is prevented from turning, and to disengage from the mounting wall 31 when the pivoting lever 62 is in an unlocking position, where the housing 41 is set free to turn about the first axis 311. The biasing member 63 is in the form of a coil spring 63 which is disposed to bias the cam follower segment 621 toward the first end 613 so as to urge the pivoting lever 62 toward the locking position.

The drive motor 7 is mounted within the housing 41 and is electrically connected to the lawn mower to drive a grass cutting member (not shown) which is mounted under the major wall 51 of the guard member 5.

Figure 9:
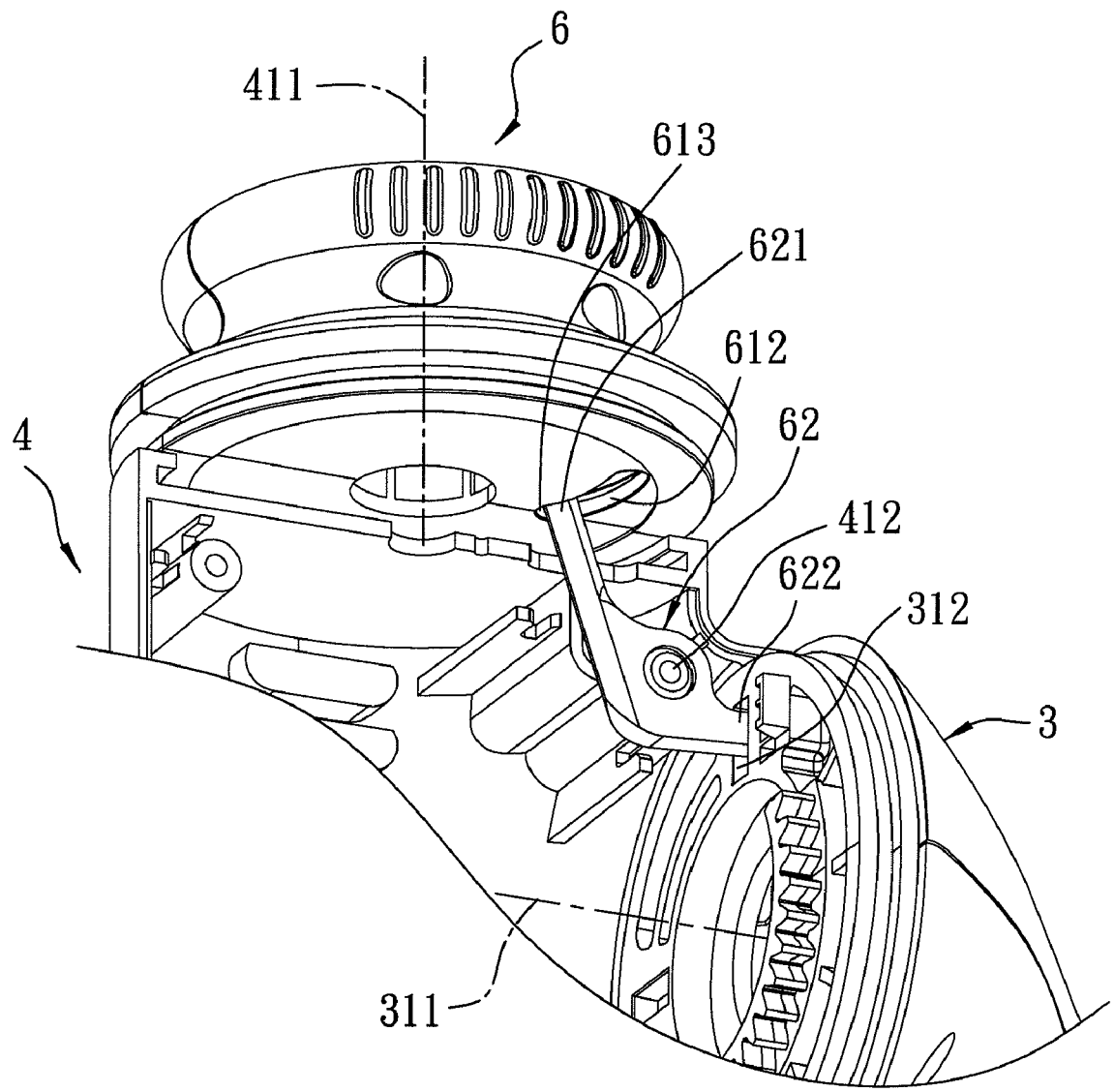
FIG. 9 is a fragmentary perspective view showing a pivoting lever in a locking position.

As shown in FIG. 8, when the turnable unit 4 is in the first position, where the second axis 411 of the housing 41 is in an upright line, the gear wheel 42 is engaged with a lower end of the first arcuate rack member 32 and the guard member 5 is in a first guarding position, i.e., at a lower side of the turnable unit 4 such that the skirt portion 53 is located at a rear side of the major wall 51 (the right side of FIG. 8). In this stage, a sweeping plane of the grass cutting member is disposed parallel to the ground so as to increase a mowing area of the lawn mower. Moreover, the pivoting lever 62 is in the locking position where the locking end 622 is engaged in the first groove 312, as shown in FIG. 9.

Figure 10:
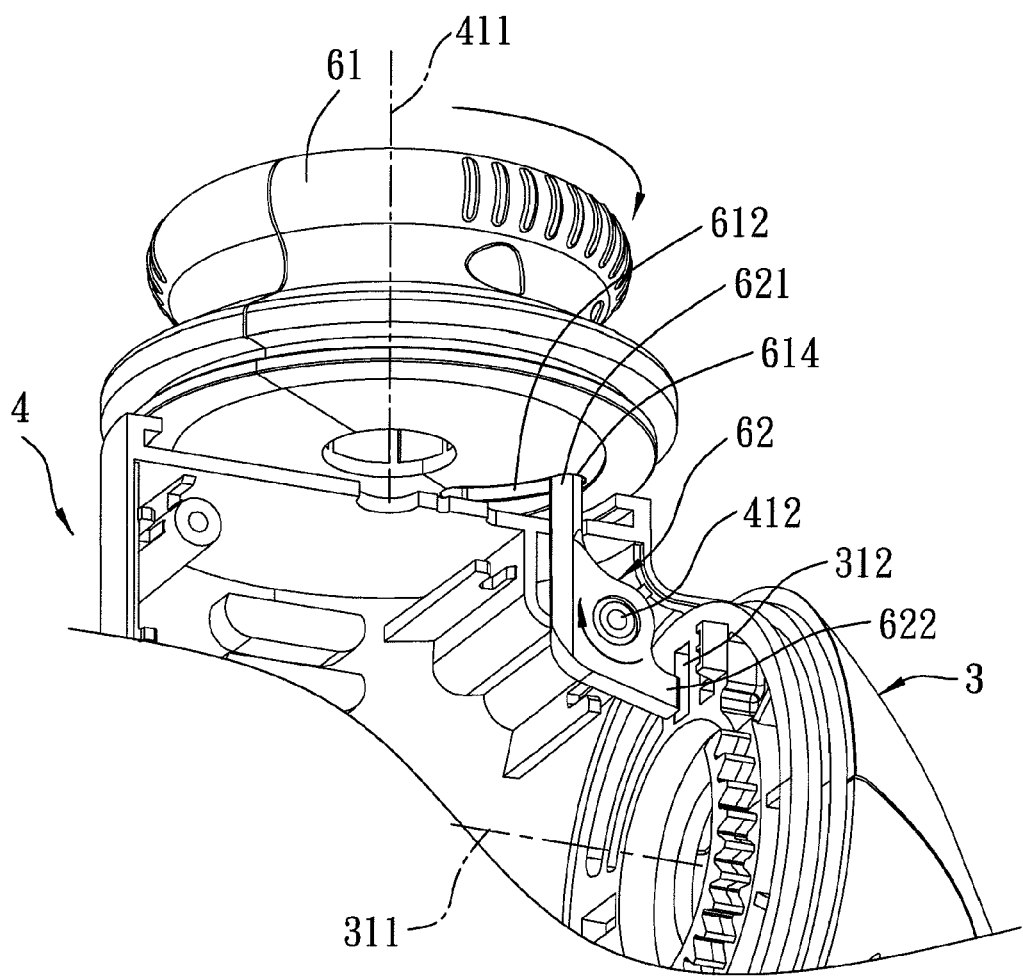
FIG. 10 is a fragmentary perspective view showing the pivoting lever in an unlocking position.
Figure 11:
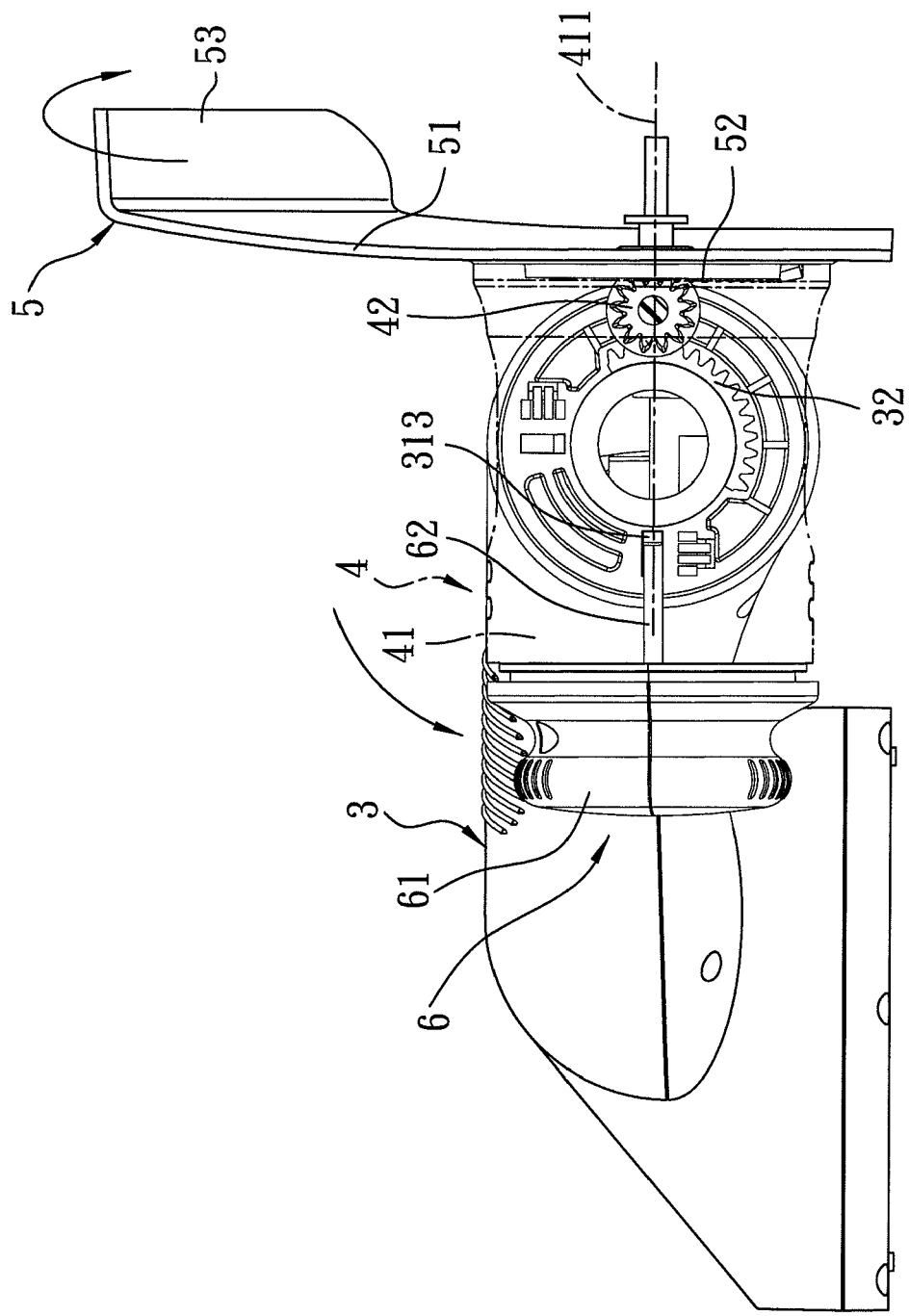
FIG. 11 is a schematic view showing the grass cutting member in a second position.

When it is desired to operate the grass cutting member on an obstructed area, such as a wall corner, a trench side, etc., as shown in FIG. 10, the operating member 61 is turned to move the cam follower segment 621 to the second end 614 such that the pivoting lever 62 is turned to the unlocking position, where the locking end 622 disengages from the first groove 312. Subsequently, the housing 41 is turned about the first axis 311 to the second position, as shown in FIG. 11. The gear wheel 42 is moved along the first arcuate rack member 32 to be located at a rear end of the first arcuate rack member 32 (the right side of FIG. 11), and the guard member 5 is in a second guarding position, i.e., at a rear side of the turnable unit 4 such that the skirt portion 53 is located at an upper side of the major wall 51. In this stage, a sweeping plane of the grass cutting member is disposed normal to the ground so as to be operated on an obstructed area. Moreover, the pivoting lever 62 is in the locking position where the locking end 622 is engaged in the second groove 312.

As mentioned above, a sweeping area of the grass cutting member is adjusted by turning of the housing 41 between the first position to increase a mowing area of the lawnmower and to place the skirt portion 53 rearwardly of the grass cutting member, and the second position to enable the grass cutting member to be operated on an obstructed area, and to place the skirt portion 53 upwardly of the grass cutting member. By means of meshed engagement of the first and second arcuate rack members 32,52 and the gear wheel 42, the adjustment can be made easier and simpler.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

What is claimed is:

1. An auxiliary device adapted to be electrically connected to a lawn mower comprising:
   a connecting unit adapted to be mounted to the lawn mower, and having a mounting wall which defines a first axis normal thereto and substantially parallel to the ground, and a first arcuate rack member which is disposed on said mounting wall and which extends angularly about the first axis;
   a housing which has a tubular surface that surrounds a second axis transverse to the first axis, and which is mounted on and which is turnable relative to said mounting wall about the first axis between a first position, where the second axis is in an upright line that is substantially normal to the ground, and a second position, where the second axis forms an included angle relative to the upright line, said tubular surface having operating-side and cutting-side tubular regions opposite to each other along the second axis;
   a guard member having
      a major wall which is mounted on and which is turnable relative to said cutting-side tubular region about the second axis, said major wall having mount and marginal regions which are radially opposite to each other, and which extend angularly about the second axis,
      a skirt portion which extends parallel to the second axis from said marginal region, and
      a second arcuate rack member which is disposed on said mount region, and which extends angularly about the second axis; and
   first and second pinions which are coaxially with each other, which are mounted on said cutting-side tubular region, and which are revolvable relative to said cutting-side tubular region, said first and second pinions being in meshed engagements with said first and second arcuate rack members, respectively, such that, when said housing is turned from the first position to the second position, said skirt portion is displaced angularly from a first guarding position to a second guarding position which is angularly spaced apart from said first guarding position relative to the second axis.

2. The auxiliary device according to claim 1, further comprising a locking member which is movable relative to said operating-side tubular region between an unlocking position, where said housing is set free to turn about the first axis, and a locking position, where said housing is prevented from turning.

3. The auxiliary device according to claim 2, further comprising an operating member which is mounted on and which is turnable relative to said operating-side tubular region about the second axis by a manual force, and which has a cam surface, said locking member being in form of a pivoting lever which is pivotally connected to said operating-side tubular region about a fulcrum axis, and which has a cam follower segment and a locking end opposite to said cam follower segment relative to the fulcrum axis such that, by means of slidable engagement between said cam follower segment and said cam surface, said locking end is moved to engage with said mounting wall when said pivoting lever is in the locking position, and to disengage from said mounting wall when said pivoting lever is in the unlocking position.

4. The auxiliary device according to claim 3, wherein said mounting wall has first and second grooves which are angularly displaced from each other about the first axis and which are configured to permit said locking end to be engaged therein when said housing is placed in the first and second position, respectively.

5. The auxiliary device according to claim 3, further comprising a biasing member which is disposed to bias said pivoting lever toward the locking position.

* * * * *